(12) United States Patent
Glimcher

(10) Patent No.: US 11,847,081 B2
(45) Date of Patent: Dec. 19, 2023

(54) SMART NETWORK INTERFACE CONTROLLER (SMARTNIC) STORAGE NON-DISRUPTIVE UPDATE

(71) Applicant: DELL PRODUCTS L.P., Round Rock, TX (US)

(72) Inventor: Boris Glimcher, Tel Aviv (IL)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

(21) Appl. No.: 17/703,919

(22) Filed: Mar. 24, 2022

(65) Prior Publication Data

US 2023/0305977 A1    Sep. 28, 2023

(51) Int. Cl.
| | |
|---|---|
| *G06F 13/38* | (2006.01) |
| *G06F 13/40* | (2006.01) |
| *G06F 9/455* | (2018.01) |

(52) U.S. Cl.
CPC ............ *G06F 13/385* (2013.01); *G06F 9/455* (2013.01); *G06F 13/4022* (2013.01); *G06F 2213/0026* (2013.01); *G06F 2213/3808* (2013.01)

(58) Field of Classification Search
CPC .... G06F 13/385; G06F 9/455; G06F 13/4022; G06F 2213/0026; G06F 2213/3808
See application file for complete search history.

(56) References Cited

U.S. PATENT DOCUMENTS

| | | | |
|---|---|---|---|
| 2020/0136996 A1* | 4/2020 | Li | H04L 47/125 |
| 2021/0019270 A1* | 1/2021 | Li | G06F 13/4204 |
| 2021/0373786 A1* | 12/2021 | Glimcher | G06F 3/0629 |
| 2022/0210097 A1* | 6/2022 | Yang | H04L 67/1097 |
| 2022/0334989 A1* | 10/2022 | Bar-Ilan | G06F 13/4282 |
| 2022/0391341 A1* | 12/2022 | Rosenbaum | G06F 13/4221 |

* cited by examiner

*Primary Examiner* — Henry Tsai
*Assistant Examiner* — Aurangzeb Hassan
(74) *Attorney, Agent, or Firm* — NORTH WEBER & BAUGH LLP

(57) ABSTRACT

Traditionally, servers are interconnected inside a data center using regular network cards. It is desired that high-available network-attached storage arrays have the feature of non-disruptive upgrade (NDU) for software and firmware, while one or more applications are still running IO. With the emergence of SmartNICs, there are many functions available now to SmartNIC that may enhance server and entire solution capabilities. Since SmartNIC is a new emerging technology, there are no adequate solutions currently for NDU while running I/O. The present patent document discloses embodiments for upgrading the SmartNIC software without disruption to the host applications. A shared namespace may be implemented inside an emulated NVMe/PCIe device, such as a data processing unit (DPU) or infrastructure processing unit (IPU), such that multiple instances may be enabled to run both old and new target emulation SPDK-based software together using multiple paths to achieve SmartNIC storage NDU.

20 Claims, 10 Drawing Sheets

800

- 805 — Enabling, on a host server, a multiple-path configuration
- 810 — Creating a NVMe subsystem in a SmartNIC communicatively coupled to the host server
- 815 — Creating, in the NVMe subsystem, a remote namespace (NS) as a shared NS which may be shared between different NVMe controllers
- 820 — Running an old NVMe/PCIe target emulation SPDK-based software corresponding to a host application on a first NVMe controller on a first PCIe physical function with the shared NS attached to the first NVMe controller
- 825 — Uploading a new NVMe/PCIe target emulation SPDK-based software
- 830 — Running the new NVMe/PCIe target emulation SPDK-based software, on a second NVMe controller on a second PCIe physical function with the shared NS attached to the second NVMe controller when the old NVMe/PCIe target emulation SPDK-based software is running
- 835 — Recognizing, at the host server, the shared NS and using the multiple-path configuration for the shared NS
- 840 — Removing the old NVMe/PCIe target emulation SPDK-based software
- 845 — Sending, from the host sever, one or more commands corresponding to the host application only to the second controller to complete the NDU

SMART NETWORK INTERFACE CONTROLLER (SMARTNIC) STORAGE NON-DISRUPTIVE UPDATE

BACKGROUND

A. Technical Field

The present disclosure relates generally to information handling systems. More particularly, the present disclosure relates to non-disruptive updates for network storage.

B. Background

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Traditionally, servers are interconnected inside a data center using regular network cards. It is desired that high-available network-attached storage arrays have the feature of non-disruptive upgrade (NDU) of their software and firmware, while one or more applications are still running input/output (I/O) and no crash or service down is experienced. With the emergence of smart network interface controllers (also known as smart network interface cards or SmartNIC in short), there are many functions available now to SmartNIC that may enhance server and entire solution capabilities. Since SmartNIC is a new emerging technology, there are no acceptable solutions for NDU while running I/O.

Accordingly, it is highly desirable to find new, more efficient ways for non-disruptive updates for SmartNIC storage.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 8 depicts a process of non-disruptive update for SmartNIC storage, according to embodiments of the present disclosure.

DETAILED DESCRIPTION OF EMBODIMENTS

Figure 1:
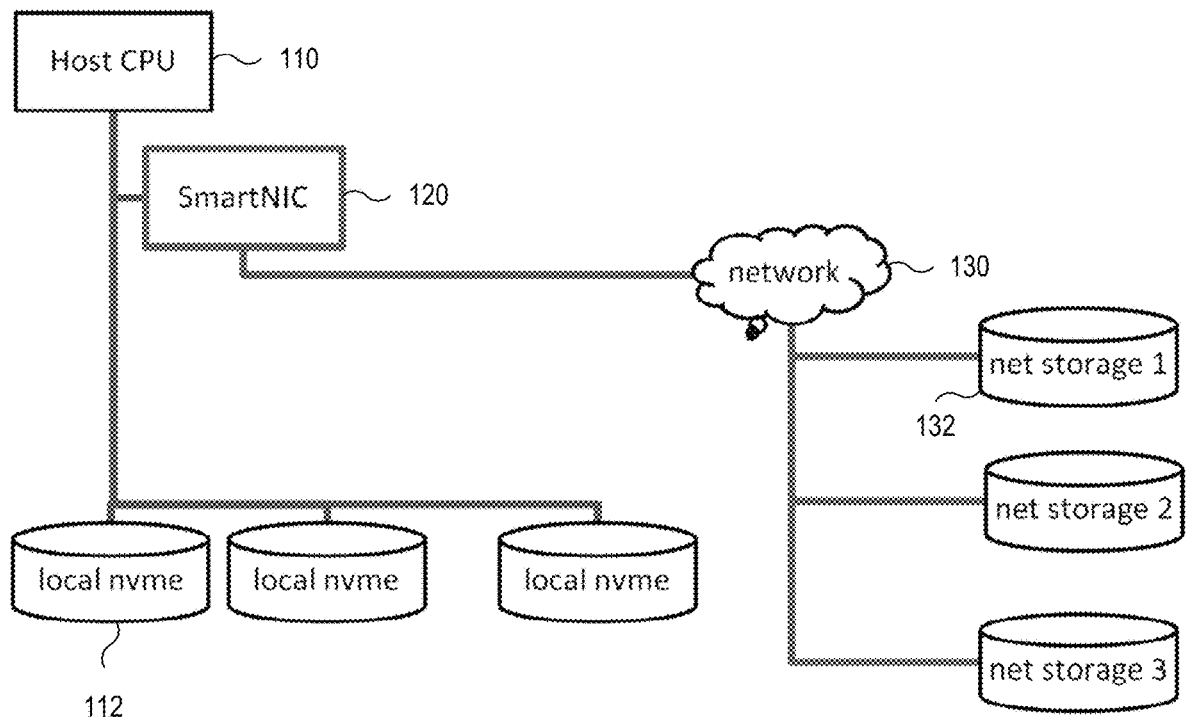
FIG. 1 ("FIG. 1") depicts a schematic of SmartNIC with network storage, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," "attached," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to a system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall also be noted that although embodiments described herein may be within the context of SmartNIC emulated storage, aspects of the present disclosure are not so limited. Accordingly, the aspects of the present disclosure may be applied or adapted for use in other contexts.

A. An Overview of SmartNIC with Network Storage

SmartNIC is a programmable network interface controller (also known as network interface card or NIC) that makes data center networking, security, and storage efficient and flexible. FIG. 1 depicts a schematic of SmartNIC with network storage, according to embodiments of the present disclosure. A host CPU 110 couples to one or more network storages 132 (e.g., storage area networks or SANs) via a SmartNIC 120 and a network 130. The host CPU 110 may also couple to one or more local NVMe drives 112. The SmartNIC may comprise computational resources exposed to the customer, along with the necessary open-source tools to utilize those computational resources to process network, storage, and security traffic both as it enters and exits a server as well as offload the host CPU at an application level.

1. NVMe Emulation

One of the functionalities of a SmartNIC in storage space is to present a remote storage as if it was local. Such a presentation may be referred to as NVMe emulation. It may be implemented as a software stack running inside the SmartNIC and does the translation from local NVMe to NVMe-over-Fabrics (NVMe-oF) inside the SmartNIC. NVMe emulation may be useful for customers that may not use NVMe-oF directly, especially given that NVMe emulation is a relatively new protocol and not all Linux or Windows distributions currently support it.

Figure 2:
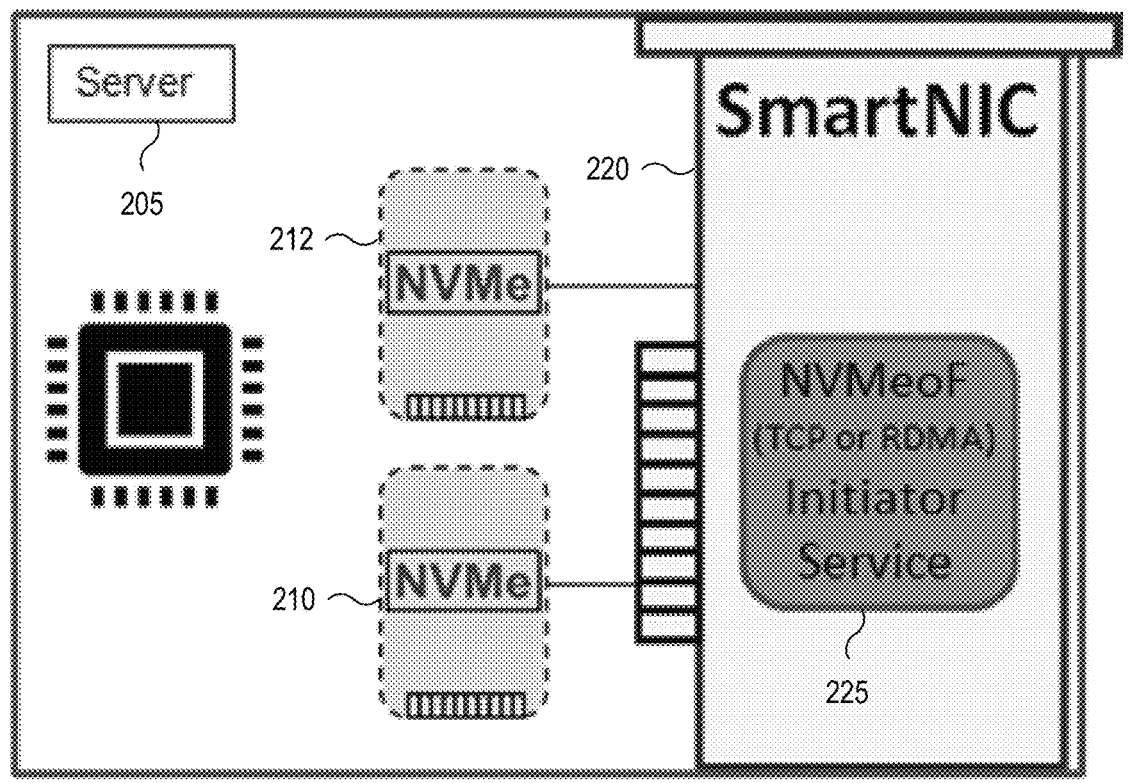
FIG. 2 depicts a schematic of non-volatile memory express (NVMe) emulation from a server perspective, according to embodiments of the present disclosure.

FIG. 2 depicts a schematic of NVMe emulation from a server perspective, according to embodiments of the present disclosure. A server 205 couples to one or more NVMe drives, e.g., 210 and 212, via a SmartNIC 220, which incorporates NVMe-oF initiator service 225 for storage access. NVMe-oF is an extension of the NVMe network protocol to Ethernet and Fibre Channel to deliver faster and more efficient connectivity between storage and servers as well as more efficient CPU usage for application host servers. The NVMe-oF initiator service 225 may support TCP/IP protocol or remote direct memory access (RMDA).

In certain circumstances, an application may run on a host server and use NVMe emulation block devices to perform read/write operations to one or more remote storages. Traditional high-available network-attached storage arrays have the feature of non-disruptive upgrade (NDU) of their software and firmware, while applications are still running input/output (110) operations and no crash or service down is experienced. However, since SmartNIC is a new emerging technology, there are no acceptable solutions for NDU in SmartNIC while running 10 operations. Just a simple stop/kill of an NVMe emulation application or a SmartNIC reboot may cause the application to get timed out and/or crash, which is not acceptable especially if the application is mission-critical.

B. Embodiments for SmartNIC software NDU

Described hereinafter are embodiments for SmartNIC software upgrading without disruption to a host application.

1. Fast Complete Restart

Intuitively, a naïve approach may be very simple and involve steps of uploading a new application version without running, killing an old application version quickly, and starting the new application version quickly. If the entire upgrading process may be done under I/O timeout (usually 30 seconds as being acceptable in the storage industry), such an upgrade may be called an NDU. The problem with this naïve approach is that under IO, many resources may be used and it takes a lot of time to free them. Therefore, the killing of the old application version may be time-consuming. Similarly, the start of the new application version may also take a lot of time because the start process may involve new memory allocation, metadata loading, network reconnecting, etc. As a result, the naïve process may be longer than the IO timeout, which may cause application timeout, application stop-working, or even system crash.

2. Embodiments of Multipath Approach a) Embodiments of Shared Namespaces

Figure 3:
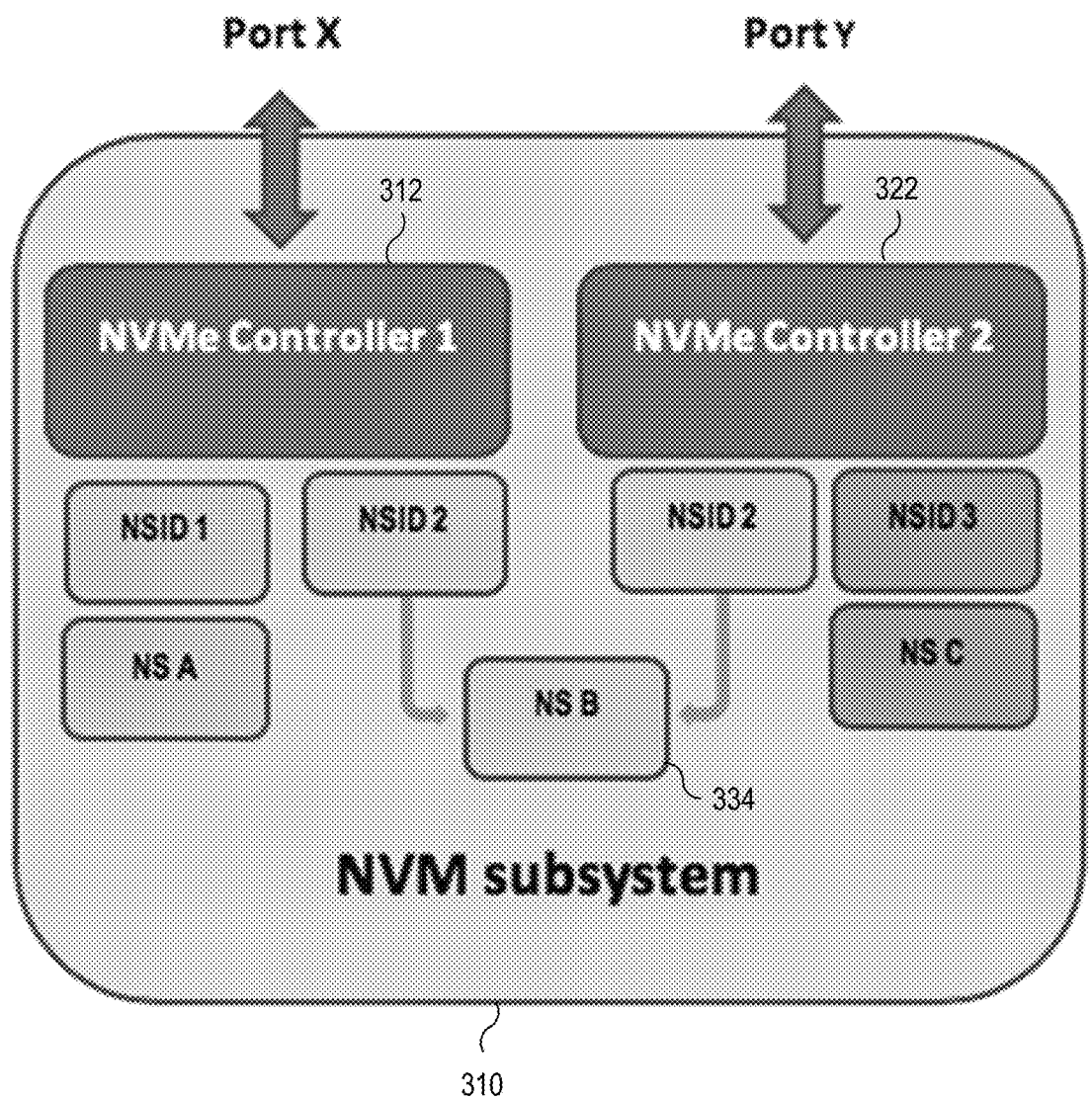
FIG. 3 depicts a schematic of a shared namespace (NS) under NVMe protocol, according to embodiments of the present disclosure.

To address these issues, embodiments of a shared namespace feature of NVMe protocol may be used. FIG. 3 depicts a schematic of a non-volatile memory (NVM) subsystem with a shared namespace (NS) under the NVMe protocol, according to embodiments of the present disclosure. The NVM subsystem 310 comprises a first NVMe controller 312 and a second NVMe controller 312 with each NVMe controller respectively coupled to a port for host communication. As shown in FIG. 3, the first NVMe controller 312 couples to Port X and the second NVMe controller 322 couples to Port Y. The NVM subsystem 310 further comprises a plurality of memory blocks with each block identified by a namespace identifier (NSID) used by an NVMe controller to provide access to a corresponding namespace. In NVMe protocol, the namespace is a collection of logical block addresses (LBA) accessible by host software. It shall be noted that an NSID is a representation of logical blocks addressable by the host software, rather than the physical isolation of blocks. In one or more embodiments, the namespace in NVMe may be the same as a volume in a small computer system interface (SCSI).

As shown in FIG. 3, each NVMe controller may respectively access a plurality of NSIDs. For example, the first NVMe controller 312 has access to namespace A (NSID=1) and namespace B (NSID=2), while the second NVMe controller 322 has access to namespace B (NSID=2) and namespace C (NSID=3). The namespace B 334 is the namespace shared between the first NVMe controller 312 and the second NVMe controller 322. In one or more embodiments, the shared NSID itself may be used as a universally unique identifier (UUID). Once the shared NSID, e.g., NS B 334, is exposed to a host, the host may detect that this is a shared namespace because it has the same NSID and UUID. In one or more embodiments, the NVM subsystem may be integrated within a data processing unit (DPU) or an infrastructure processing unit (IPU), which may be integrated into a SmartNIC or in addition to the Smart-NIC.

In one or more embodiments, such a shared NSID is implemented inside an emulated NVMe/PCIe device for SmartNIC emulated storage NDU. Furthermore, the shared NSID may be used in the same host (root complex) on different PCIe functions without any PCIe switch in between. In one or more embodiments, shared NS may be used, besides NVM subsystems, for NVMe-oF attached devices, PCIe switched based devices, or PCIe dual-ported drives.

b) Embodiments of Multiple Paths

Figure 4:
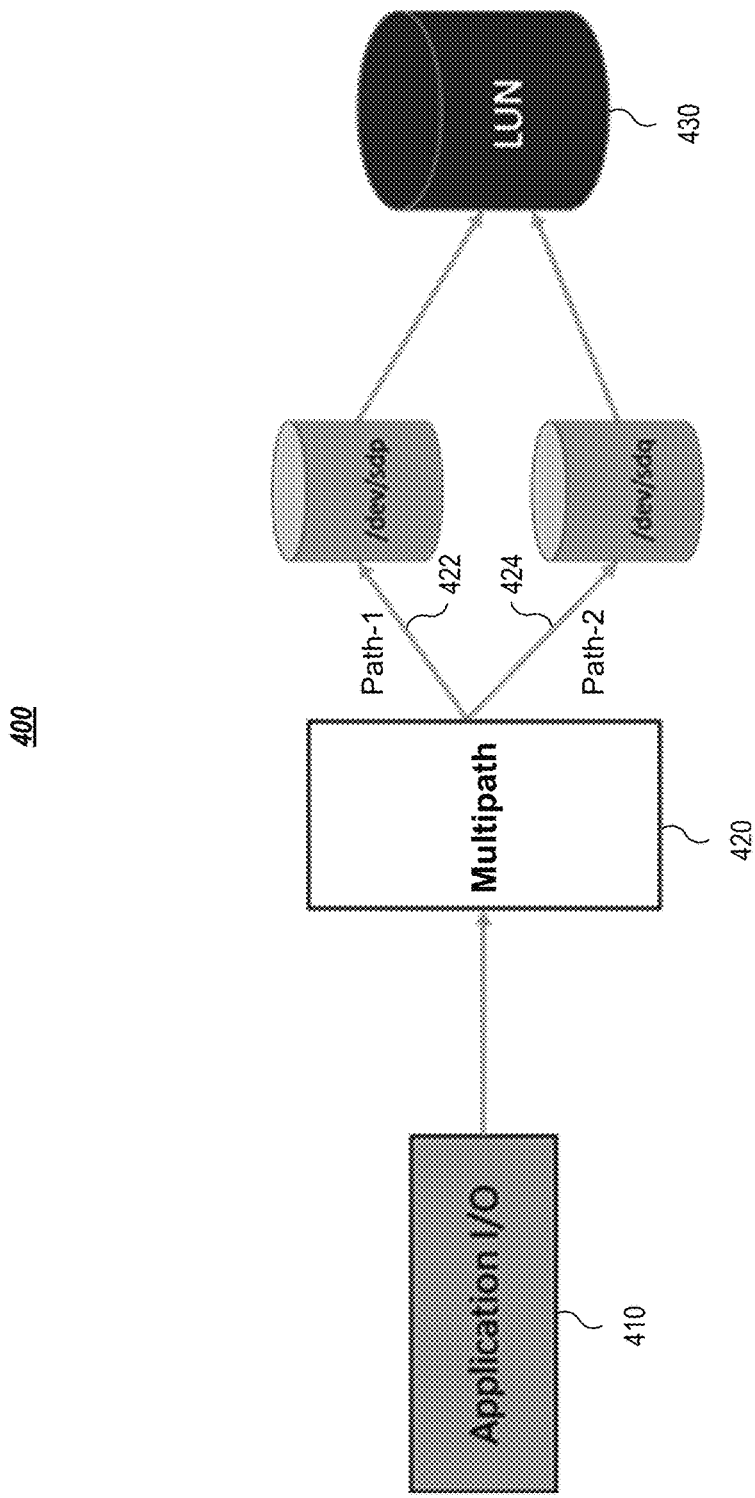
FIG. 4 depicts multipath data flow to a logical unit number (LUN) or a storage area network (SAN), according to embodiments of the present disclosure.

For multiple paths, Linux may run multipath on block devices with two options, NVMe core native multipath or device manager (DM) multipath, with both options treating multiple devices as if they were the same device. Both options may spread IOs to multiple devices in a round-robin manner with one or more service policies. When some of the devices are not available, e.g., offline, I/Os may be sent to the remaining online devices. FIG. 4 depicts multipath data flow to a LUN (or a SAN), according to embodiments of the present disclosure. Application I/Os 410 are distributed, by a Linux multipath module 420, between a first path 422 and a second path 424 to a LUN 430, which represents a unique identifier, addressed by the small computer system interface (SCSI) protocol or by SAN protocols that encapsulate SCSI, for designating an individual or collection of physical or virtual storage devices that execute one or more I/O commands with a host computer.

Besides Linux multipath, some other host-based data path management solutions, e.g., Dell EMC PowerPath of Dell, Inc. of Round Rock, Texas, may also be used to implement multiple-path functionality. In many applications, those options may add more value and insights to the internals of the multiple-path implementation.

c) Embodiments of Emulated NVMe/PCIe targets

In one or more embodiments, applications, e.g., containers, virtual machines (VMs), or native running apps, may consume emulated NVMe/PCIe block devices when the applications are running on a host. Each emulated NVMe device may be represented by a specific and only one PCIe physical or virtual function. Multiple NVMe devices may need to run on separate multiple functions.

In one or more embodiments, target implementation of an emulated device may be created to handle submission and completion queue pairs (QPs) as well as doorbells and interrupts. Code for target implementation may be running as a storage performance development kit (SPDK) application in a polling mode, handling both administrative management operations as well as I/O (e.g., read, write, etc.) operations.

Figure 5:
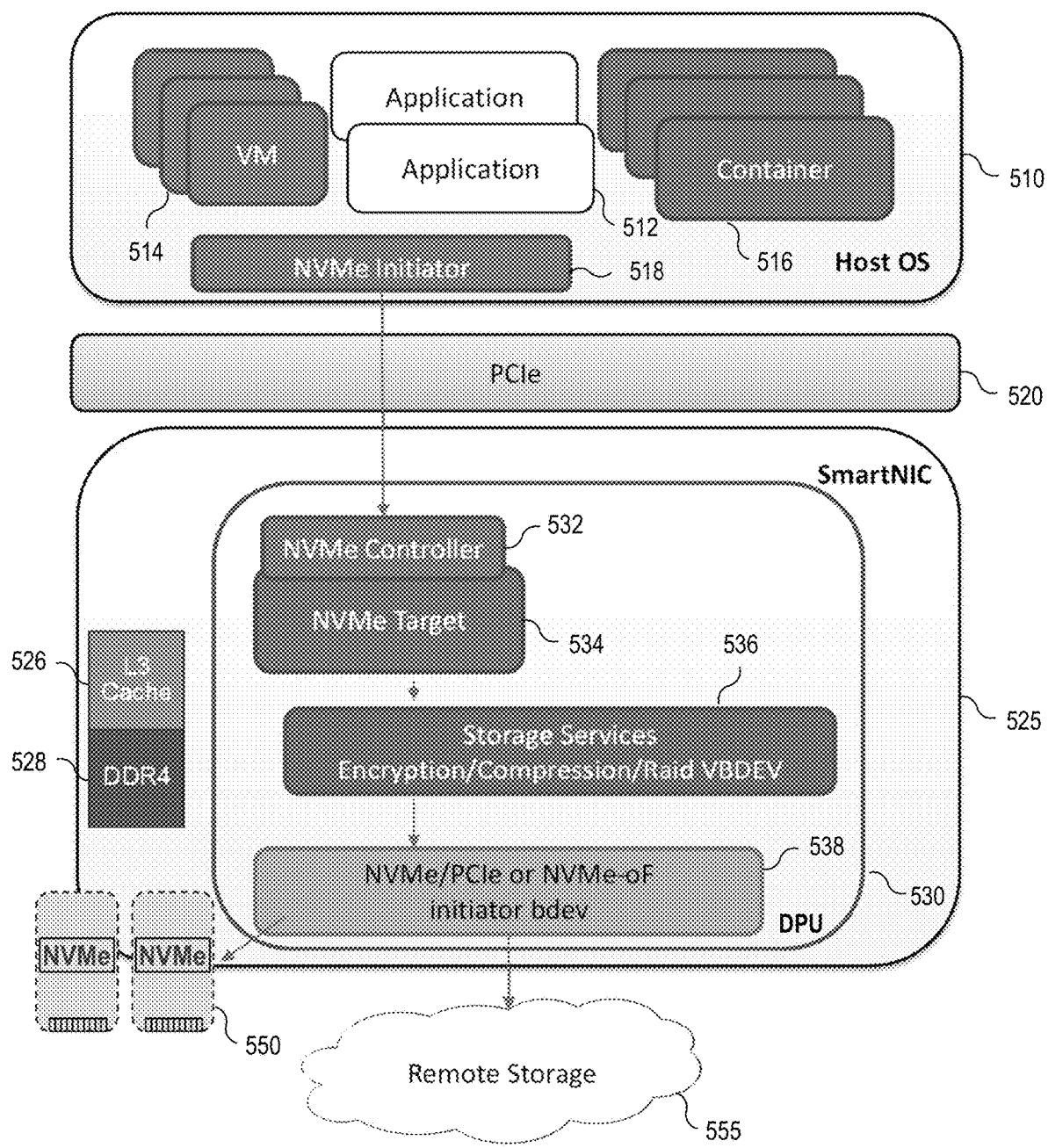
FIG. 5 depicts a schematic of emulated NVMe/Peripheral Component Interconnect Express (PCIe) target implementation, according to embodiments of the present disclosure.

FIG. 5 depicts a schematic of an emulated NVMe/PCIe target implementation, according to embodiments of the present disclosure. As shown in FIG. 5, a host 510 couples to a SmartNIC 525 via PCIe connection 520. A plurality of apps, e.g., native running apps 512, VMs 514, or containers 516, may run on the host. The host 510 comprises an NVMe initiator 518 for communication with any NVMe storage target. In one or more embodiments, the SmartNIC 525 may comprise a DPU 530 and one or more caches, e.g., an L3 cache 526, and an internal memory 528, e.g., a DDR4 memory. The DPU 530 may incorporate an NVMe subsystem comprising an NVMe controller 532 and a storage service module 536. The NVMe controller 532 may be a software-defined emulation module to enable hardware-accelerated virtualization of an emulated NVMe target 534. The storage service module 536 may be utilized to provide one or more storage-related implementations, e.g., encryption, compression, and/or combination of virtual block devices (VBDEVs). In one or more embodiments, the combination of VBDEVs may be implemented using a redundant array of independent disks (RAID), which provides functionality to combine multiple VBDEVs into one RAID VBEDV for data redundancy, performance improvement, or both.

In one or more embodiments, the NVMe subsystem may further comprise an initiator block device (BDEV) module 538, which may support NVMe/PCIe protocol or NVMe-oF protocol. After initial NVMe target handling, the IO operations may be redirected to either one or more local NVMe storages 550 attached to the SmartNIC or a remote storage, e.g., internet small computer systems interface (iSCSI) or NVMe-oF connected systems or arrays.

It shall be noted that in FIG. 5, the NVMe target 534 is a singleton SPDK-based application running inside the Smart-NIC and provides emulation for all the emulated NVMe devices, no matter what physical or virtual functions are represented by those emulated NVMe devices. To increase performance, a larger amount of CPU cores inside the SmartNIC may be needed by the same NVMe target SPDK application.

d) Embodiments of Multiple Emulated NVMe/PCIe Targets

Figure 6:
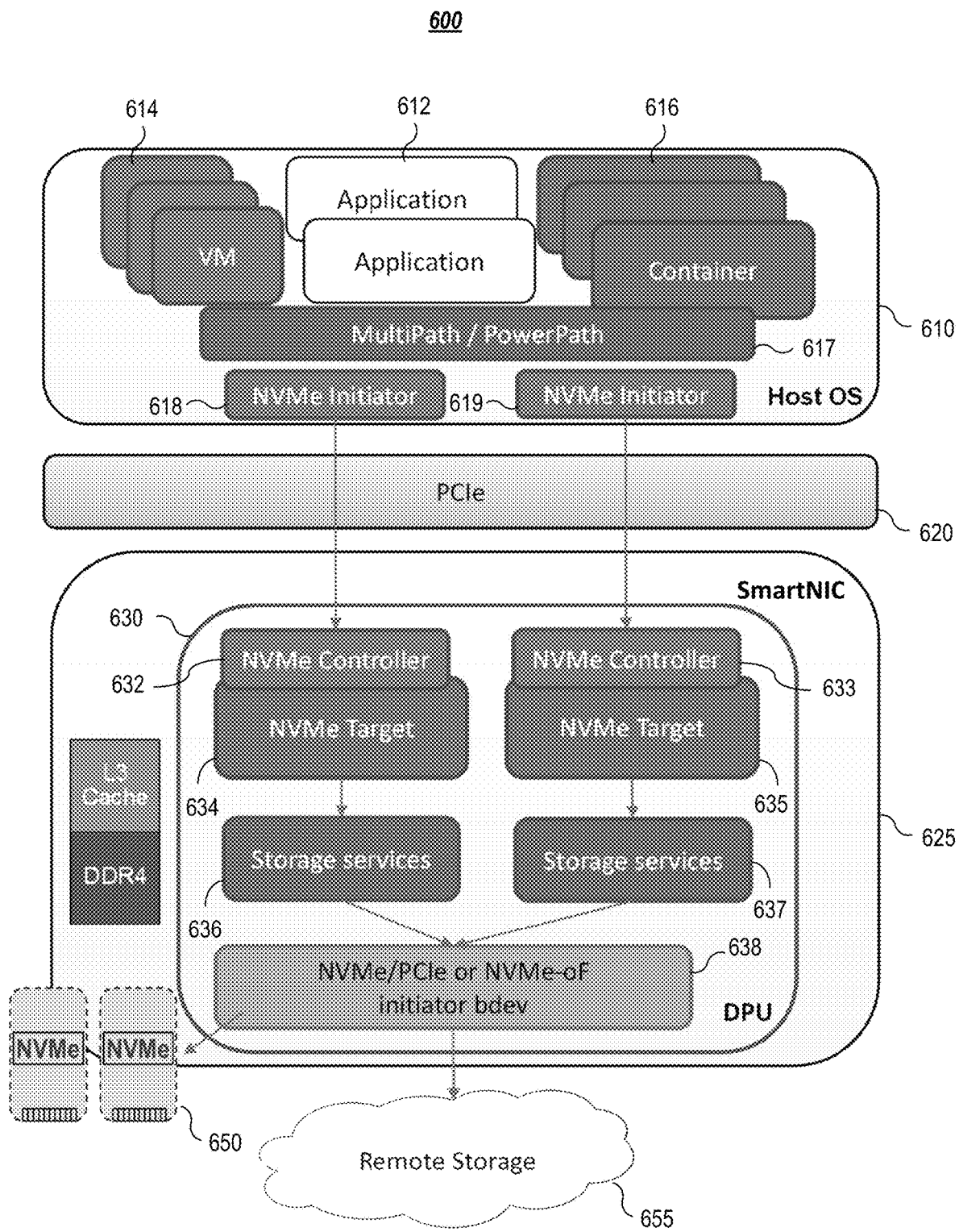
FIG. 6 depicts a schematic of running multiple emulated NVMe/PCIe targets simultaneously, according to embodiments of the present disclosure.

FIG. 6 depicts a schematic of running multiple emulated NVMe/PCIe targets simultaneously, according to embodiments of the present disclosure. Multiple SPDK instances, such as two stances as shown in FIG. 6, may be running on the same SmartNIC, with each instance handling its own emulated devices on a separate set of functions. In one or more embodiments, all the functions may be equally divided between the two instances.

As shown in FIG. 6, a host 610 couples to a SmartNIC 625 via PCIe connection 620. A plurality of apps, e.g., native running apps 612, VMs 614, or containers 616, may run on the host. The host 610 comprises a multipath module 617 coupled to a plurality of NVMe initiators, e.g., a first NVMe initiator 618 and a second NVMe initiator 619, to distribute data flows (e.g., I/O operations) among the plurality of NVMe initiators. Embodiments shown in FIG. 4 regarding multiple paths may be applied to the multipath module 617 for data flow distribution.

In one or more embodiments, the SmartNIC 625 may comprise a DPU 630 that incorporates an NVMe subsystem to support multiple SPDK instances. The NVMe subsystem may comprise a first NVMe controller 632 to enable hardware-accelerated virtualization of a first emulated NVMe target 634, a second NVMe controller 633 to enable hardware-accelerated virtualization of a second emulated NVMe target 635, a first storage service module 636 coupled to the first emulated NVMe target 634, a second storage service module 637 coupled to the second NVMe target 635. The first NVMe controller 632, the first emulated NVMe target 634, and the first storage service module 636 form a first SPDK instance. The second NVMe controller 633, the second emulated NVMe target 635, and the second storage service module 637 form a second SPDK instance. In one or more embodiments, the first second SPDK instance has no communication with the second SPDK instance since the data flow distribution between the two instances is handled from the host side by the multipath module 617. In one or more embodiments, the first emulated NVMe target 634 and the second emulated NVMe target 635 may have one or more shared namespace such that the shared namespace feature may be implemented inside an emulated NVMe/PCIe device.

In one or more embodiments, the first NVMe controller 632 and the second NVMe controller 633 may be an emulation module to enable hardware-accelerated virtualization of the first emulated NVMe target 634 and the second emulated NVMe target 635 respectively. The storage service modules 636 and 637 may be utilized to provide one or more storage-related implementations, e.g., encryption, compression, and/or combination of virtual block devices (VB-DEVs).

In one or more embodiments, the NVMe subsystem may further comprise an initiator BDEV module 638 coupled to both storage service modules 636 and 637. The initiator BDEV module 638 may support NVMe/PCIe protocols and/or NVMe-oF protocol to direct data flows, e.g., I/Os to either one or more local NVMe storages 650 attached to the SmartNIC or a remote storage 655. In an alternative embodiment, the initiator BDEV module 638 may be split into or replaced by two BDEV modules such that the storage service module 636 and the storage service module 637 may be respectively coupled to one of the two BDEV modules.

In one or more embodiments, in addition to the separation of PCIe functions, CPU and memory resources may be separated as well. From a memory perspective, each SPDK instance allocates a slice from the global memory pool. Total memory consumption for the multiple SPDK instance may be higher than a single instance. Various resource management approaches, including resource sharing, may be implemented to improve resource utilization efficiency for memory and/or CPU. For example, multiple CPU cores may be distributed, uniformly or non-uniformly, between the two instances.

In one or more embodiments, remote storage connection resources may be shared among the multiple instances. Although such a connection resource sharing is supported by certain protocols such as NVMe-oF, connections to the same remote namespace in embodiments of the present patent disclosure may be different since the connections are from multiple initiators in the same SmartNIC-host NVMe qualified name (NQN). Additionally, management of both instances (e.g., for configuration and API) may be separated as well. In one or more embodiments, for the multiple stances, SPDK uses a UNIX socket, an inter-process communication mechanism that allows bidirectional data exchange between processes running on the same machine. As a result, each socket for each instance may be an exemplary implementation.

Figure 7:
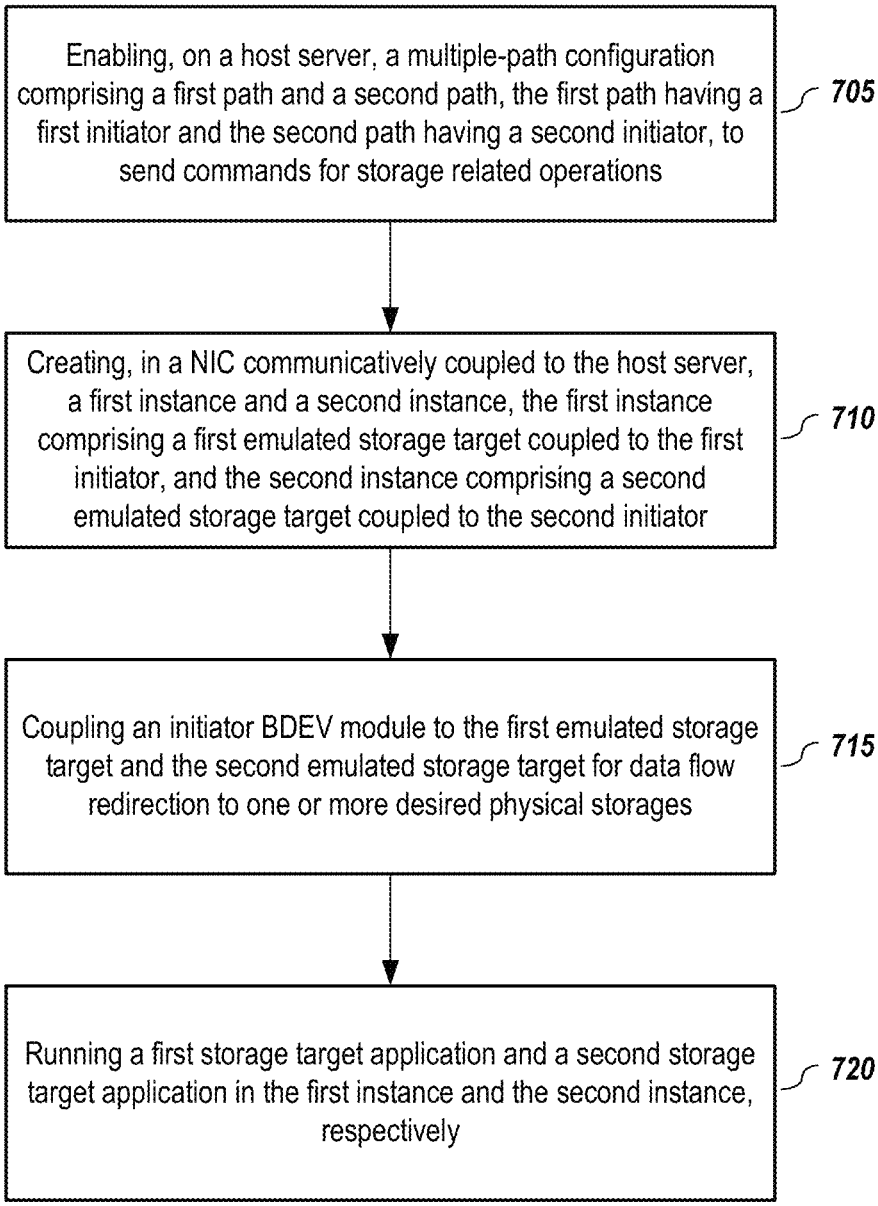
FIG. 7 depicts a process of running multiple NVMe/PCIe emulations based on multiple SPDK instances on the same SmartNIC, according to embodiments of the present disclosure.

FIG. 7 depicts a process of running multiple NVMe/PCIe emulations based on multiple SPDK instances on the same SmartNIC, according to embodiments of the present disclosure. In step 705, a multiple-path configuration comprising a first path and a second path is enabled on a host server. The first path has a first initiator and the second path has a second initiator to send I/O commands for storage-related operations. In one or more embodiments, the first initiator and the second initiator are NVMe initiators. In step 710, multiple instances comprising at least a first instance and a second instance are created in a NIC, e.g., a SmartNIC, communicatively coupled to the host server. The first instance comprises a first emulated storage target coupled to a first initiator and the second instance comprises a second emulated storage target coupled to a second initiator. The NIC may be coupled to the host server via PCIe connection. In one or more embodiments, the first emulated storage target and the second emulated storage target are emulated NVMe targets. The first emulated storage target may be coupled to the first initiator via a first NVMe controller, and the second emulated storage target may be coupled to the second initiator via a second NVMe controller. The first NVMe controller and the second NVMe controller may be emulation modules to enable hardware-accelerated virtualization of the first emulated storage target and the second emulated storage target respectively.

In step 715, an initiator BDEV module couples to the first emulated storage target and the second emulated storage target for directing data flow to one or more desired physical storages, which may be one or more local NVMe storages attached to the SmartNIC or may be remote storage. The initiator BDEV module may support NVMe/PCIe protocols and/or NVMe-oF protocol. Optionally, a first storage service module may be used to provide storage-related implementations, such as encryption, compression, and/or VBDEV combination, for the first instance before data flow direction by the initiator BDEV module; a second storage service module may be used to provide storage-related implementations for the second instance before data flow direction by the initiator BDEV module. In one or more embodiments, the first storage service module, the first emulated storage target, the second storage service module, the second emulated storage target, and the initiator BDEV module may be integrated within one DPU. In step 720, a first storage target application and a second target application are running on the first controller in the first instance and the second controller in the second instance, respectively. In one or more embodiments, the first target application and the second target application may be NVMe/PCIe SPDK based target applications.

Once the two NVMe/PCIe SPDK based target applications are running to serve admin and I/O commands with each instance representing its own devices with different namespaces, the two target applications may be used for SmartNIC storage NDU.

FIG. 8 depicts a process of non-disruptive update for SmartNIC storage, according to embodiments of the present disclosure. In step 805, a multiple-path configuration is enabled on a host server. When in operation, the multiple-path configuration may support multiple paths for storage-related operations. In step 810, an NVMe subsystem is created in a SmartNIC coupled to the host server and exposed to the host server. In one or more embodiments, the NVMe subsystem may be created inside a DPU in the SmartNIC. The NVMe subsystem may comprise multiple NVMe controllers and one or more namespaces. In step 815, a remote NS is created in the NVMe subsystem and enabled as a shared NS which may be shared between different NVMe controllers.

In step 820, an old (or current) NVMe/PCIe target emulation SPDK-based software is running on a first NVMe controller, among the multiple NVMe controllers, on a first PCIe physical function with the shared NS attached to the first NVMe controller. The old NVMe/PCIe target emulation SPDK-based software corresponds to a host application running on the host server. The host server discovers the first NVMe controller and the shared NS in the NVMe subsystem. The application running on the host server starts sending I/O commands to the shared NS through the first NVMe controller.

In step 825, a new NVMe/PCIe target emulation SPDK-based software is uploaded to the DPU in the SmartNIC without running. In step 830, the new NVMe/PCIe target emulation SPDK-based software is running on a second NVMe controller, among the multiple NVMe controllers, on a second PCIe physical function with the shared NS attached to the second NVMe controller when the old NVMe/PCIe target emulation SPDK-based software is running. The second PCIe physical function is a separate PCIe physical function from the first PCIe physical function. In one or more embodiments, the old version software and the new version software may be managed, by an orchestrator module, to run together in a desired or predetermined time interval to minimize potential interruption during the run-time of both versions.

In step 835, upon recognizing the shared NS between the first NVMe controller and the second NVMe controller, the host server starts using the multiple-path configuration comprising a first path from the host server to the shared NS through the first NVMe controller and a second path from the host server to the shared NS through the second NVMe controller. Depending on policies of the multiple-path configuration, both the new NVMe/PCIe target emulation SPDK-based software and the old NVMe/PCIe target emulation SPDK-based software may serve I/O commands and there may be no timeout, or only the old NVMe/PCIe target emulation SPDK-based software may serve I/O commands.

In step 840, the old NVMe/PCIe target emulation SPDK-based software is removed or killed. In one or more embodiments, the old NVMe/PCIe target emulation SPDK-based software is killed after verification of successful operation for the new NVMe/PCIe target emulation SPDK-based software. In step 845, the host server recognizes that the first NVMe controller is offline and therefore sends I/O commands corresponding to the host application only to the second NVMe controller which runs the new NVMe/PCIe target emulation SPDK-based software.

Using the process shown in FIG. 8, there are no timeout or major issues to the I/O, and the application running is live and operational. In one or more embodiments, before step 840 of removing or killing the old NVMe/PCIe target emulation SPDK-based software, the host server may need to verify that the new NVMe/PCIe target emulation SPDK-based software functions. For example, the host server may verify that I/O commands through the second NVMe controller are performed with a latency within a predetermined threshold. If the latency is above the predetermined threshold, the host server may stop the second NVMe controller instead and send out an error message regarding the new NVMe/PCIe target emulation SPDK-based software.

In one or more embodiments, the SmartNIC storage NDU process may be handled, partially or fully, by an orchestrator module, which is in charge of one or more of scheduling and uploading the new version of NVMe/PCIe target emulation SPDK-based software, scheduling and running both the old version and new version, confirming a successful operation of the new version software, and removing the old version for NDU completion. The orchestrator module may be in the host server, in the SmartNIC, or in a separate management server that couples to the host server and the SmartNIC for various management tasks.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read-only memory (ROM), and/or other types of memory. Additional components of the computing system may include one or more drives (e.g., hard disk drives, solid-state drives, or both), one or more network ports for communicating with external devices as well as various input and output (I/O) devices. The computing system may also include one or more buses operable to transmit communications between the various hardware components.

Figure 9:
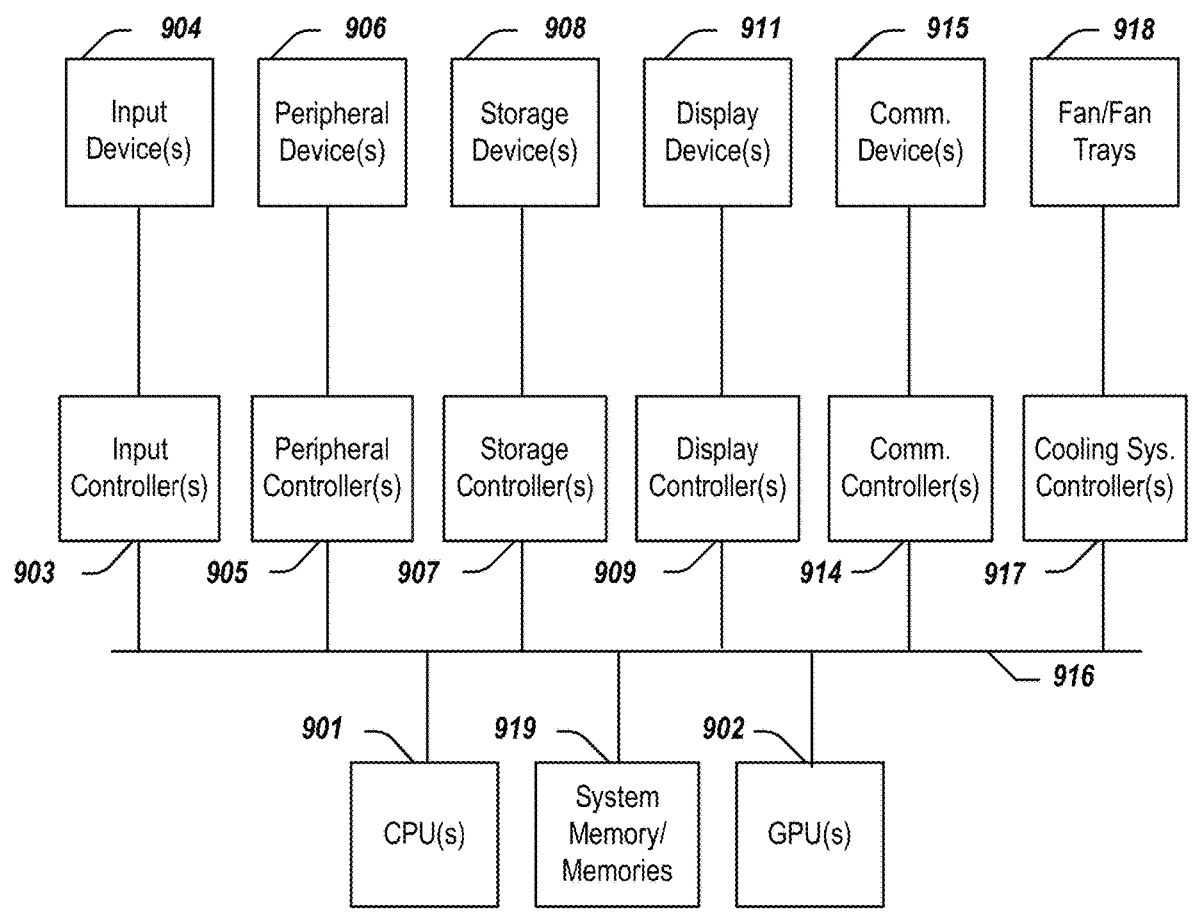
FIG. 9 depicts a simplified block diagram of an information handling system, according to embodiments of the present disclosure.

FIG. 9 depicts a simplified block diagram of an information handling system (or computing system), according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more CPUs 901 that provides computing resources and controls the computer. CPU 901 may be implemented with a microprocessor or the like and may also include one or more graphics processing units (GPU) 902 and/or a floating-point coprocessor for mathematical computations. In one or more embodiments, one or more GPUs 902 may be incorporated within the display controller 909, such as part of a graphics card or cards. The system 900 may also include a system memory 919, which may comprise RAM, ROM, or both.

A number of controllers and peripheral devices may also be provided, as shown in FIG. 9. An input controller 903 represents an interface to various input device(s) 904, such as a keyboard, mouse, touchscreen, stylus, microphone, camera, trackpad, display, etc. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT) display, a thin film transistor (TFT) display, organic light-emitting diode, electroluminescent panel, plasma panel, or any other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 900 comprises one or more fans or fan trays 918 and a cooling subsystem controller or controllers 917 that monitors thermal temperature(s) of the system 900 (or components thereof) and operates the fans/fan trays 918 to help regulate the temperature.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example, magnetic media such as hard disks, floppy disks, and magnetic tape; optical media such as compact discs (CDs) and holographic devices; magneto-optical media; and hardware devices that are specially configured to store or to store and execute program code, such as application-specific integrated circuits (ASICs), programmable logic devices (PLDs), flash memory devices, other non-volatile memory (NVM) devices (such as 3D XPoint-based devices), and ROM and RAM devices.

Figure 10:
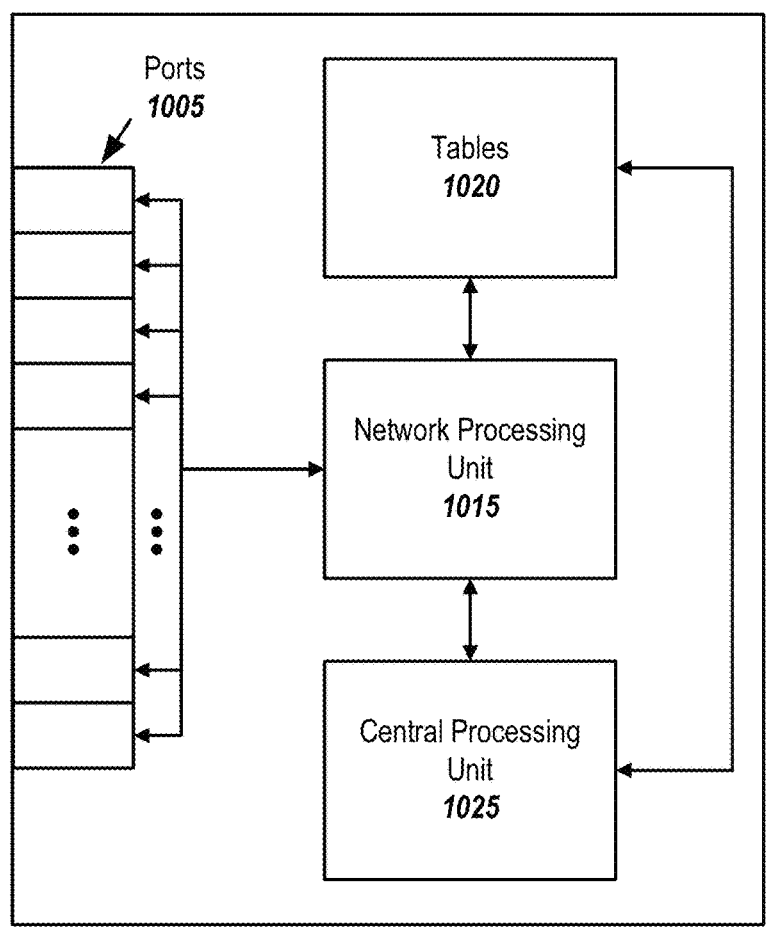
FIG. 10 depicts an alternative block diagram of an information handling system, according to embodiments of the present disclosure.

FIG. 10 depicts an alternative block diagram of an information handling system, according to embodiments of the present disclosure. It will be understood that the functionalities shown for system 1000 may operate to support various embodiments of the present disclosure—although it shall be understood that such system may be differently configured and include different components, additional components, or fewer components.

The information handling system 1000 may include a plurality of I/O ports 1005, a network processing unit (NPU) 1015, one or more tables 1020, and a CPU 1025. The system includes a power supply (not shown) and may also include other components, which are not shown for sake of simplicity.

In one or more embodiments, the I/O ports 1005 may be connected via one or more cables to one or more other network devices or clients. The network processing unit 1015 may use information included in the network data received at the node 1000, as well as information stored in the tables 1020, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for storage management comprising:
    given a host server that supports a multiple-path configuration for storage-related operation:
        creating, in a network interface card (NIC) communicatively coupled to the host server, a subsystem comprising multiple controllers and a shared namespace (NS) shareable between different controllers;
        running a first target application on a first controller, among the multiple controllers, with the shared NS attached to the first controller; and
        running a second target application on a second controller, among the multiple controllers, with the shared NS attached to the second controller when the first target application is running, the shared NS is shared between the first controller and the second controller.

2. The computer-implemented method of claim 1 wherein the NIC is a smart NIC (SmartNIC), the subsystem is a non-volatile memory express (NVMe) subsystem incorporated within a data processing unit in the SmartNIC.

3. The computer-implemented method of claim 1 wherein the first controller is a first non-volatile memory express (NVMe) controller and the second controller is a second NVMe controller.

4. The computer-implemented method of claim 3 wherein the first target application is an old target emulation storage performance development kit (SPDK) based software corresponding to a host application running on the host server, the second target application is a new target emulation SPDK based software corresponding to the host application.

5. The computer-implemented method of claim 4 wherein the new target emulation SPDK based software is uploaded to the second NVMe controller before running.

6. The computer-implemented method of claim 4 further comprising:
    recognizing, at the host server, the shared NS between the first NVMe controller and the second NVMe controller;
    using, by the host server, the multiple-path configuration comprising a first path from the host server to the shared NS through the first NVMe controller and a second path from the host server to the shared NS through the second NVMe controller;
    removing the old target emulation SPDK based software; and
    sending, from the host server, one or more commands corresponding to the host application only to the second NVMe controller for storage update.

7. The computer-implemented method of claim 4 wherein the old target emulation SPDK based software is running on the first NVMe controller on a first peripheral component interconnect express (PCIe) physical function, the new target emulation SPDK based software is running on the second NVMe controller on a second PCIe physical function separate from the first PCIe physical function.

8. The computer-implemented method of claim 1 further comprising:
    communicatively coupling an initiator block device (BDEV) module to at least one of the first controller and the second controller for directing data flow to one or more desired physical storages.

9. A system for storage management comprising:
    a network interface card (NIC) coupled to a host server that supports a multiple-path configuration for storage-related operations, the NIC comprising a data processing unit (DPU) that incorporates a non-volatile memory express (NVMe) subsystem comprising:
        a first instance comprising a first emulated storage target and a first controller, a first target application running on the first controller;
        a second instance comprising a second emulated storage target and a second controller, a second target application running on the second controller when the first target application is running on the first controller, the first emulated storage and the second emulated storage having at least one shared namespace (NS) shared between the first controller and the second controller; and
        an initiator block device (BDEV) module coupled to at least one of the first emulated storage target and the second emulated storage target for data flow direction to one or more desired physical storages.

10. The system of claim 9 wherein the NVMe subsystem further comprising:
    a first storage service module coupled between the initiator BDEV module and the first emulated storage target, the first storage service module provides one or more implementations selected from encryption, compression, and combination of virtual block devices (VBDEVs) for the first instance; and
    a second storage service module coupled between the initiator BDEV module and the second emulated storage target, the second storage service module provides one or more implementations selected from encryption, compression, and combination of VBDEVs for the second instance.

11. The system of claim 9 wherein the first controller is a first non-volatile memory express (NVMe) controller and the second controller is a second NVMe controller.

12. The system of claim 11 wherein the first target application is an old target emulation storage performance development kit (SPDK) based software corresponding to a host application running on the host server, the second target application is a new target emulation SPDK based software corresponding to the host application.

13. The system of claim 12 wherein the old target emulation SPDK based software is running on the first NVMe controller on a first peripheral component interconnect express (PCIe) physical function, the new target emulation SPDK based software is running on the second NVMe controller on a second PCIe physical function separate from the first PCIe physical function.

14. The system of claim 12 wherein the multiple-path configuration is in use when the host server recognizes the at least one shared NS between the first NVMe controller and the second NVMe controller, the multiple-path configuration comprising a first path from the host server to the at least one shared NS through the first NVMe controller and a second path from the host server to the at least one shared NS through the second NVMe controller.

15. A non-transitory computer-readable medium or media comprising one or more sequences of instructions which, when executed by one or more processors, causes steps to be performed comprising:

creating, in a network interface card (NIC) communicatively coupled to a host server that supports a multiple-path configuration for storage-related operation, a subsystem comprising multiple controllers and a shared namespace (NS) shareable between different controllers;

running a first target application on a first controller, among the multiple controllers, with the shared NS attached to the first controller;

running a second target application on a second controller, among the multiple controllers, with the shared NS attached to the second controller when the first target application is running, the shared NS is shared between the first controller and the second controller; and communicatively coupling an initiator block device (BDEV) module to at least one of the first controller and the second controller for directing data flow to one or more desired physical storages.

16. The non-transitory computer-readable medium or media of claim 15 wherein the subsystem is a non-volatile memory express (NVMe) subsystem, the first controller is a first NVMe controller, and the second controller is a second NVMe controller.

17. The non-transitory computer-readable medium or media of claim 16 the first target application is an old target emulation storage performance development kit (SPDK) based software corresponding to a host application running on the host server, the second target application is a new target emulation SPDK based software corresponding to the host application.

18. The non-transitory computer-readable medium or media of claim 17 wherein the non-transitory computer-readable medium or media further comprises one or more sets of instructions which, when executed by at least one of the one or more processors, causes steps to be performed comprising:

recognizing, at the host server, the shared NS when the old target emulation SPDK based software and the new target emulation SPDK based software are running simultaneously;

using, by the host server, the multiple-path configuration comprising a first path from the host server to the shared NS through the first NVMe controller and a second path from the host server to the shared NS through the second NVMe controller;

removing the old target emulation SPDK based software; and sending, from the host server, one or more commands corresponding to the host application only to the second NVMe controller for storage update.

19. The non-transitory computer-readable medium or media of claim 17 wherein the old target emulation SPDK based software is running on the first NVMe controller on a first peripheral component interconnect express (PCIe) physical function, the new target emulation SPDK based software is running on the second NVMe controller on a second PCIe physical function separate from the first PCIe physical function.

20. The non-transitory computer-readable medium or media of claim 16 wherein the non-transitory computer-readable medium or media further comprises one or more sets of instructions which, when executed by at least one of the one or more processors, causes steps to be performed comprising:

performing, by a first storage service module coupled between the initiator BDEV module and a first emulated storage target, one or more implementations selected from encryption, compression, and combination of virtual block devices (VBDEVs) for data flow via the first emulated storage target; and performing, by a second storage service module coupled between the initiator BDEV module and a second emulated storage target, one or more implementations selected from encryption, compression, and combination of VBDEVs for data flow via the second emulated storage target.

* * * * *